United States Patent [19]

Cordeiro et al.

[11] Patent Number: 4,680,788
[45] Date of Patent: Jul. 14, 1987

[54] MICROPROCESSOR BASED CONTROL AND SWITCHING DEVICE

[75] Inventors: Craig A. Cordeiro, Westford; John P. Graham, Marlboro, both of Mass.

[73] Assignee: Data General Corporation, Westboro, Mass.

[21] Appl. No.: 528,566

[22] Filed: Aug. 31, 1983

[51] Int. Cl.⁴ .......................................... H04M 11/00
[52] U.S. Cl. ..................................................... 379/93
[58] Field of Search ... 364/200 MS File, 900 MS File; 179/2 DP, 175.21, 175.23

[56] References Cited

U.S. PATENT DOCUMENTS

| | | | |
|---|---|---|---|
| 3,889,062 | 6/1975 | Epstein | 364/200 |
| 4,048,672 | 9/1977 | Seiden et al. | 364/200 |
| 4,356,545 | 10/1982 | West | 364/200 |
| 4,484,306 | 11/1984 | Kulczyckyj et al. | 364/900 |

*Primary Examiner*—Thomas M. Heckler
*Attorney, Agent, or Firm*—Jacob Frank; Joel Wall; Irving M. Kriegsman

[57] ABSTRACT

A control and switching device which links a remote terminal by modems over telephone lines to a local central processing unit (CPU) and a local computer console terminal is disclosed. The device, which is coupled by separate lines to the modem at the local site, the local console and the TTY and ASYNC ports of the CPU, includes a microprocessor, a memory, logic circuits and a switch assembly. The switch assembly includes first, second and third switches which are interlocked and which allow three different levels of remote access of the remote terminal. When the first switch is depressed, the device is powered down, the remote terminal has no access to either the TTY or ASYNC ports of the CPU and the local console is hardwired through the device to the TTY port of the CPU. When the second switch is depressed, the local console is hardwired to the TTY port of the CPU and the remote terminal is electrically connected to the ASYNC port of the CPU. When the third switch is depressed, the local console and the remote terminal both have access to either the TTY port of the ASYNC port of the CPU. A variety of firmware commands stored in the device, some of which may be applied by the local console and some by the remote terminal, depending on which switch is depressed, provide a number of different operating modes, the modes including a conversation mode wherein the CPU is locked out and the local console and remote terminal can communicate directly with each other.

22 Claims, 13 Drawing Figures

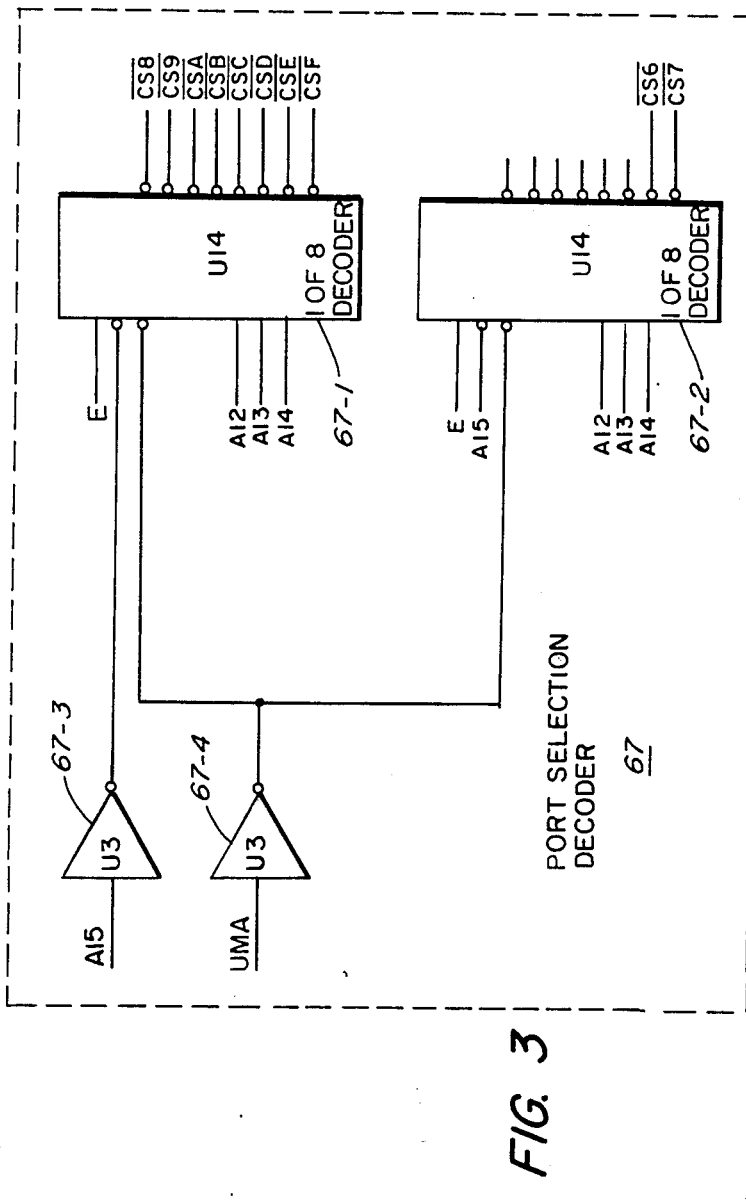
FIG. 3
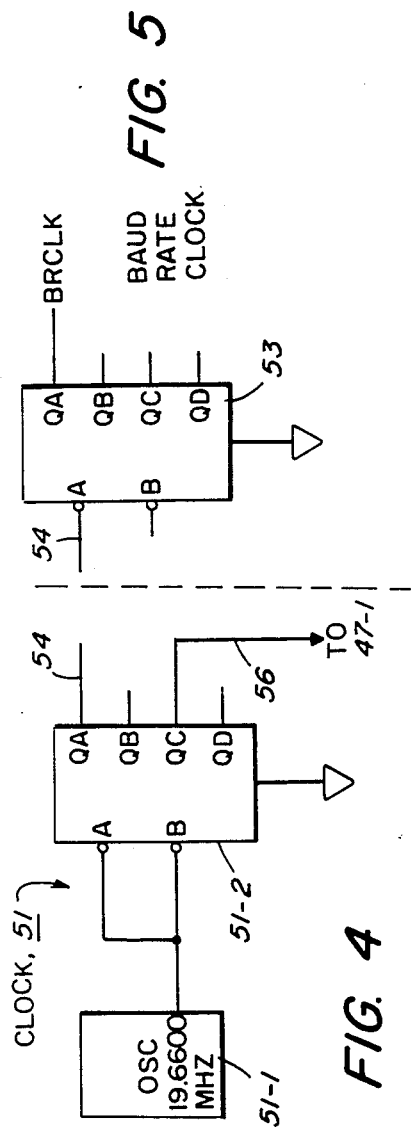
FIG. 5
FIG. 4

ASYNCHRONOUS LINE MULTIPLEXOR CONTROL LOGIC SECTION 59

MICROPROCESSOR BASED CONTROL AND SWITCHING DEVICE

BACKGROUND OF THE INVENTION

The present invention relates generally to computer networks and more particularly to a line powered control and switching device for selectively coupling a remote terminal at a remote location through modems and a telephone line to a local computer console terminal and a local CPU and which provides different degrees of access of the remote terminal and a variety of operating modes.

It is not uncommon for computer systems users to experience hardware, software or operational problems in the day-to-day use of their equipment. In some instances the problems are such that they can be diagnosed and/or corrected by on-site personnel; however, in most cases the user does not possess the technical skills needed to properly diagnose and then correct the fault. When this occurs it is generally necessary to obtain outside assistance from a technical expert at a support center.

In the past, attempts have been made to diagnose and correct operational problems by calling the support center over a telephone and describing to a technical expert at a support center what appears to be the particular problem. This technique has not proven to be very successful, mainly because of the inability of the person at the user site to accurately describe the problem and/or what he is actually observing on his display terminal. Furthermore, the technique does not enable the technical expert to actually control the operations of the computer at the user site.

Another technique that has been employed in the past has involved connecting the CPU and the display terminal at the user site to an acoustic coupler through a double throw switch. When the switch is placed in one position the CPU is connected to the display terminal and is operable with the display terminal as a user site computer. When the switch is placed in the other position the CPU is connected to the acoustic coupler. Using this arrangement it is possible to connect the CPU to either the display terminal at the user site or through a telephone link and second acoustic coupler to a display terminal at the support center. The basic problem with this technique is that although it allows either the display terminals as the user site or the display terminal at the support center to be connected to the CPU it does not allow both display terminals to be connected to and be in communication with the CPU at the same time. Thus, it does not enable a person at the support center to monitor operations of the display terminal at the user site or the operator at the user site to observe the communications between the display terminal at the support center and the CPU. In addition, once the telephone instruments at each location are inserted into their respective acoustic couplers there is no way for the person at one location to signal to the person at the other location to remove the telephone instrument from the acoustic coupler if the person wants to reestablish voice communications or return to the original operating mode.

In U.S. Pat. No. 4,356,545 to K. J. West there is described an apparatus for monitoring and/or controlling the operations of a computer at a user site from a support center over a telephone line, the computer at the user site including a central processing unit (CPU) and a display terminal. The apparatus includes a telephone instrument at each location connected to the telephone line, a display terminal connected to an acoustic coupler at the support center and a control and switching device at the user site connected to the CPU, to the display terminal at the user site and to an acoustic coupler. When a link is established between the acoustic coupler at the support center and the acoustic coupler at the user site over the telephone line, the display terminal at the support center is operable with the display terminal at the user site in either an on-line mode or a conversational mode. In the on-line mode, either display terminal can input to the CPU and the output from the CPU is displayed at both display terminals. In the conversational mode, the CPU is disengaged and inputs from either display terminal are displayed at both display terminals. In the absence of the link, the display terminal at the user site is operable with the CPU through the control and switching device.

It is an object of this invention to provide a new and improved control and switching device for allowing a remote terminal at a remote site to access a local system at a local site through modems over a telephone line.

It is another object of this invention to provide a control and switching device as described above which enables the remote terminal to access the local system for diagnostic and other purposes.

It is still another object of this invention to provide a control and switching device as described above which is microprocessor based.

It is yet still another object of this invention to provide a control and switching device as described above which is transparent to user software.

It is a further object of this invention to provide a control and switching device as described above which provides multiple degrees of access.

It is yet still a further object of this invention to provide a control and switching device as described above which does not use a framing error to cause a mode change.

It is another object of this invention to provide a control and switching device as described above which does not prevent communication between the local console and the CPU if power is down on the device.

It is still another object of this invention to provide a control and switching device which allows a remote terminal to access a local CPU either as a user or for diagnostic/maintenance purposes.

It is a further object of this invention to provide a control and switching device as described above wherein either the local computer console terminal or the remote terminal can be made master.

It is another object of this invention to provide a control and switching device as described above which is completely under control of the local console operator.

SUMMARY OF THE INVENTION

A control and switching device which allows a remote terminal to access, by modems, over a telephone line, a local system having a local CPU and a local console according to the teachings of the present invention includes a microprocessor, a memory, logic circuits and a switch assembly. The control and switching device has a first port which is adapted to be coupled to the local console, a second port which is adapted to be coupled to the TTY port of the local CPU, a third port which is adapted to be coupled to the ASYNC port of the local CPU and a fourth port which is adapted to be coupled to the modem at the site of the local system. The switch assembly includes first, second and third switches which are interlocked and which allow three different levels of remote access of the remote terminal. When the first switch is depressed, the device is powered down, the remote terminal has no access to either the TTY or ASYNC ports of the CPU and the local console is hardwired through the device to the TTY port of the CPU. When the second switch is depressed, the local console is hardwired to the TTY port of the CPU and the remote terminal is electrically connected to the ASYNC port of the CPU. When the third switch is depressed, the local console and the remote terminal both have access to either the TTY port or the ASYNC port of the CPU. A variety of firmware commands stored in the device, some of which may be applied by the local console and some by the remote terminal, depending on which switch is depressed, provide a number of different operating modes, the modes including a conversation mode wherein the CPU is locked out and the local console and remote terminal can communicate directly with each other.

Various objects and advantages will appear from the description to follow. In the description, reference is made to the accompanying drawing which forms a part thereof, and in which is shown by way of illustration, a specific embodiment for practicing the invention. This embodiment will be described in sufficient detail to enable those skilled in the art to practice the invention, and it is to be understood that other embodiments may be utilized and that structural changes may be made without departing from the scope of the invention. The following detailed description is, therefore, not to be taken in a limiting sense, and the scope of the present invention is best defined by the appended claims.

BRIEF DESCRIPTION OF THE DRAWINGS

Various features and advantages of the invention will become more readily apparent from the following detailed description of a specific embodiment of the invention when taken in conjunction with the accompanying drawings wherein like reference numerals represent like parts and wherein:

FIG. 3 is a schematic diagram of the port selection decoder in the control and switching device shown in FIG. 2;

FIG. 4 is a schematic diagram of the clock in the control and switching device shown in FIG. 2;

FIG. 5 is a schematic diagram of the BAUD rate clock in the control and switching device shown in FIG. 2;

DETAILED DESCRIPTION OF PREFERRED EMBODIMENT

The present invention is directed to a microprocessor based control and switching device which links a remote terminal by modems over telephone lines to a local CPU and a local console terminal and which, depending on the level of access, allows the remote terminal to either perform diagnostic and maintenance services or communicate with the local CPU as a remote user. The device includes a switch assembly which controls the level of access of the remote terminal and a firmware command set for providing a variety of different operating modes and levels of access. The operating modes are executed by typing BREAK KEY and then a single ASCII character, the particular characters hereinafter described being for illustrative purposes only.

Figure 1:
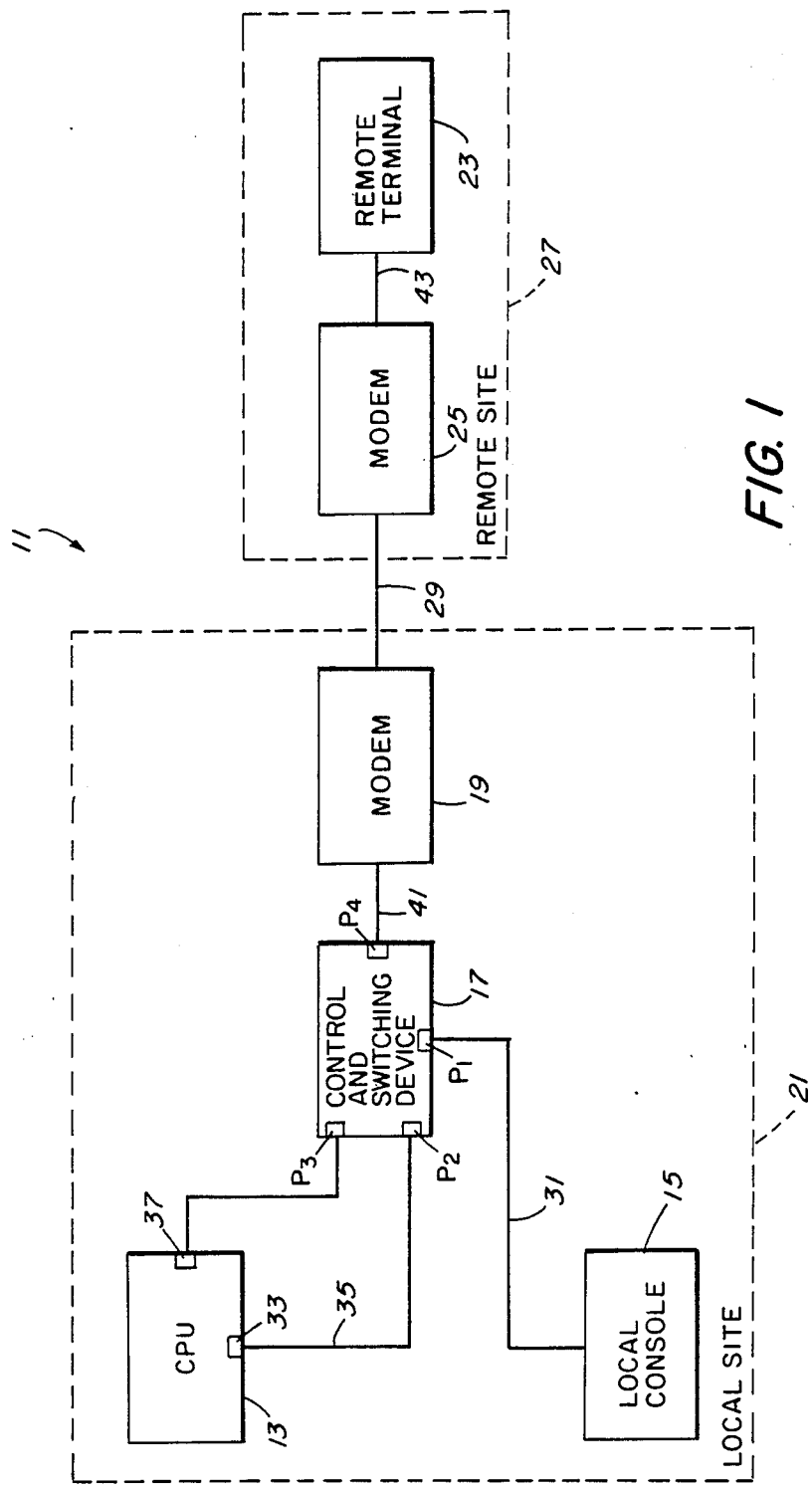
FIG. 1 is a block diagram of a computer network incorporating the control and switching device of the present invention.

Referring now to the drawings, there is illustrated in FIG. 1 a computer network constructed according to the teachings of the present invention and identified generally by reference numeral 11.

Computer network 11 includes a central processing unit (CPU) 13, a local computer console terminal 15, a control and switching device 17 and a modem 19 which are all located at a first or local site 21 and a remote console or terminal 23 and a modem 25 which are located at a second or remote site 27.

Modem 19 at local site 21 is coupled to modem 25 at remote site 27 by conventional telephone lines 29.

Local console 15 is connected to a first port P1 in control and switching device 17 by lines 31. Control and switching device 17 is connected through a second port P2 to a first port 33 on CPU 13 by lines 35, through a third port P3 to a second port 37 on CPU 13 by lines 39 and through a fourth port P4 to modem 19 by lines 41. First port 33 in CPU 13 is a TTY port and can be used both as a user port and as a port for performing diagnostics and maintenance. Second port 37 on CPU 13 is an ASYNC port and can be used only on as a user port.

Modems 19 and 25 are any type of modems that are compatable with each other.

CPU 13 is any known type such as the NOVA 3 CPU made and sold by Data General Corporation of Westboro, Mass. Terminal 15 is any known type that is operable with CPU 11. Terminal 15 may be, for example, a Model No. 6053 display terminal made and sold by Data General Corporation of Westboro, Mass. Terminal 23 is any type of display terminal operable with CPU 13 and can be, but does not have to be, the same type of display terminal as display terminal 15 or even made by the same manufacturer as display terminal 15. As will hereinafter be described, control and switching device 17 selectively links remote terminal 23 to local CPU 13 and local console terminal 15. CPU 13 and local console terminal 15 constitute a local or user site computer system.

Telephone lines 29 are any type of telephone lines capable of transmitting voice and data information.

Modem 25 is connected to remote terminal 23 by lines 43. Modems 19 and 25 operate as a pair.

Figure 2:
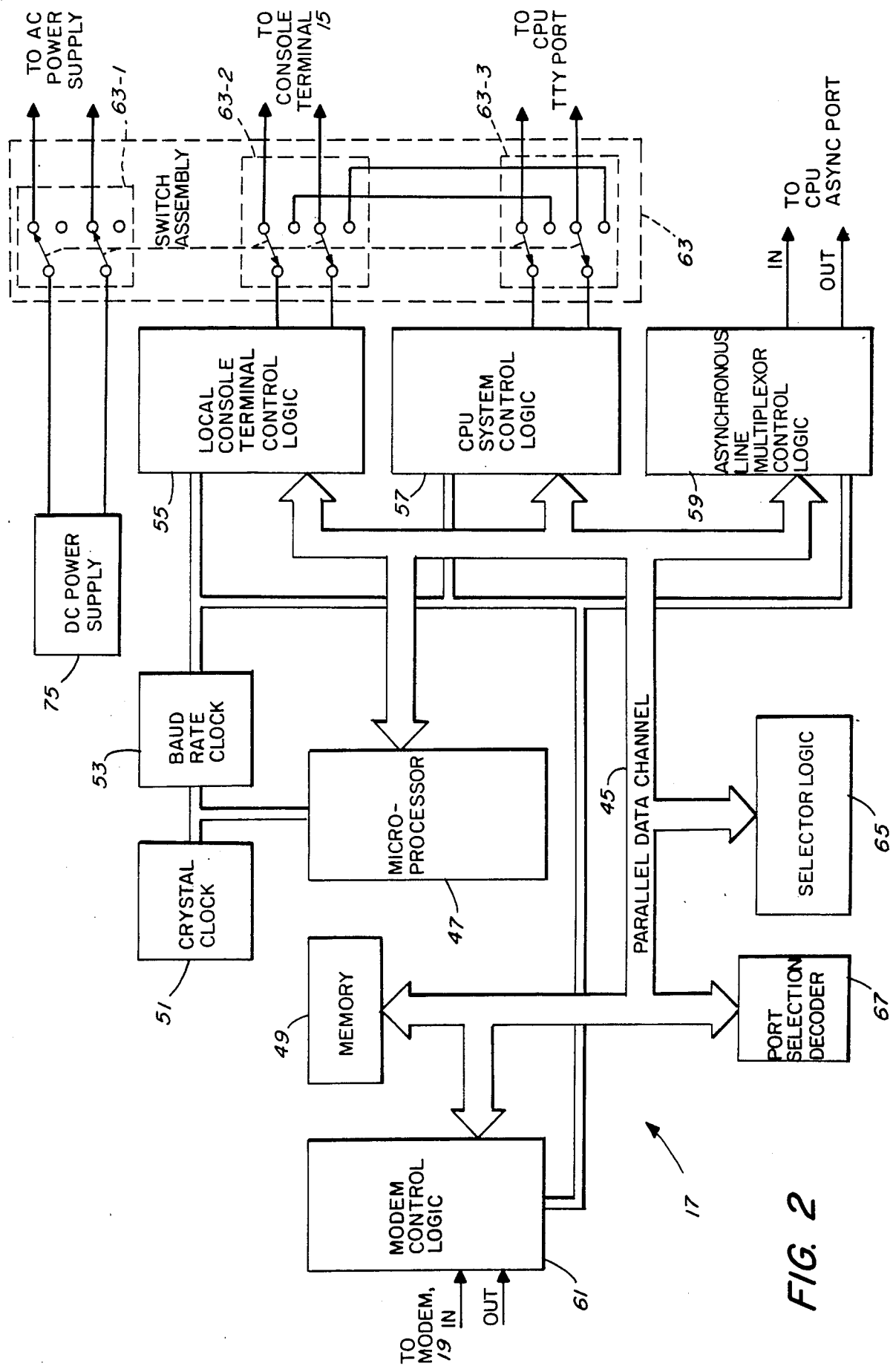
FIG. 2 is a block diagram of the control and switching device shown in FIG. 1.

Referring now to FIG. 2 there is illustrated a block diagram of control and switching device 17, the switch portion of the device being shown in somewhat simplified form.

As can be seen, control and switching device 17 is organized around a parallel data channel 45 and includes a microprocessor 47. Microprocessor 47 executes instructions it receives from a memory 49. Memory 49 includes an EPROM which holds the set of executable instructions that microprocessor 47 acts on. Microprocessor 47 receives timing signals from a crystal clock 51 which also provides timing signals to a baud rate clock 53.

Baud rate clock 53 provides timing signals to UARTS located in a local console terminal control logic section 55, a CPU system console control logic section 57, an asynchronous line multiplexor (ALM) control logic section 59 and a modem control logic section 61.

Local console terminal control logic section 55 provides an electronic interface between microprocessor 47 and CPU 13 TTY port 33.

CPU system console control logic section 57 provides an electronic interface between microprocessor 47 and CPU 13 TTY port 33.

ALM control logic section 59 provides an electronic interface between the ASYNC port 37 of CPU 13 and microprocessor 47.

Modem control logic section provides an electronic interface between modem 19 and microprocessor 47.

Control and switching device 17 further includes a switch assembly 63, a selector logic section 65 and a port selection decoder 67.

Switch assembly 65 includes three switches 63-1, 63-2 and 63-3 which are interlocked.

Switch 63-1 controls the power to control and switching device 17 from an AC source (not known). Switches 63-2 and 63-3 are coupled to local console terminal control logic 55 and CPU system control logic 57.

When switch 63-1 is depressed control and switching device is powered down and local console 15 is hardwired to port 33 of CPU 13. When switch 63-2 is depressed local console 15 is hardwired to port 33 of CPU 13 and modem is coupled to port 37 of CPU 13. When switch 63-3 is depressed local console 15 and modem 19 are both electronically coupled to both port 33 and port 37 of CPU 13.

Selector logic section 65 is an arrangement of printed circuit mounted switches for selecting various communication parameters such as parity, data bits, BUAD rate and clear to send.

Port selection decoder 67 contains the logic for performing memory addressing.

Finally, control and switching device 17 includes a DC power supply 75 which is connected to switch 63-1 and which provides the power to operate control and switching device 17 through lines (not shown).

Referring now to FIG. 3 there is illustrated a more detailed diagram of the componentry in port selection decoder 67. The componentry includes a pair of decoders 67-1 and 67-2 and a pair of inverters 67-3 and 67-4.

The details of clock 51 and BAUD rate clock 53 are shown in FIGS. 4 and 5 respectively.

Clock 51 includes a 19·6 MHZ free running crystal oscillator 51-1 and a two stage divider 51-2. The output of clock 51 is sent to BAUD rate clock 53 over line 54 and to microprocessor 47 over line 56.

Figure 6:
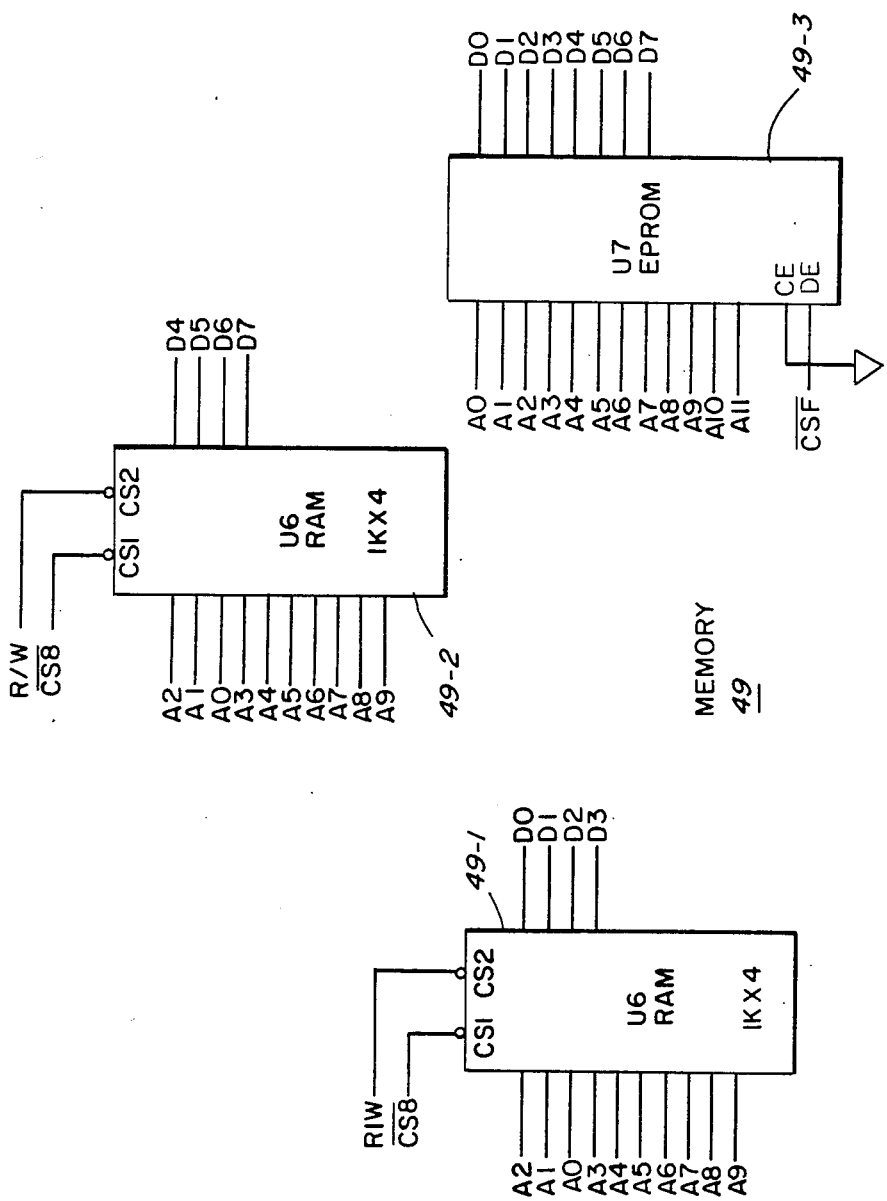
FIG. 6 is a schematic diagram of the memory section in the control and switching device shown in FIG. 2.

Memory 49 which is illustrated in FIG. 6 includes a pair of 4 bit wide RAM's 40-1 and 49-2 and an 8 bit wide EPROM 49-3.

Figure 7:
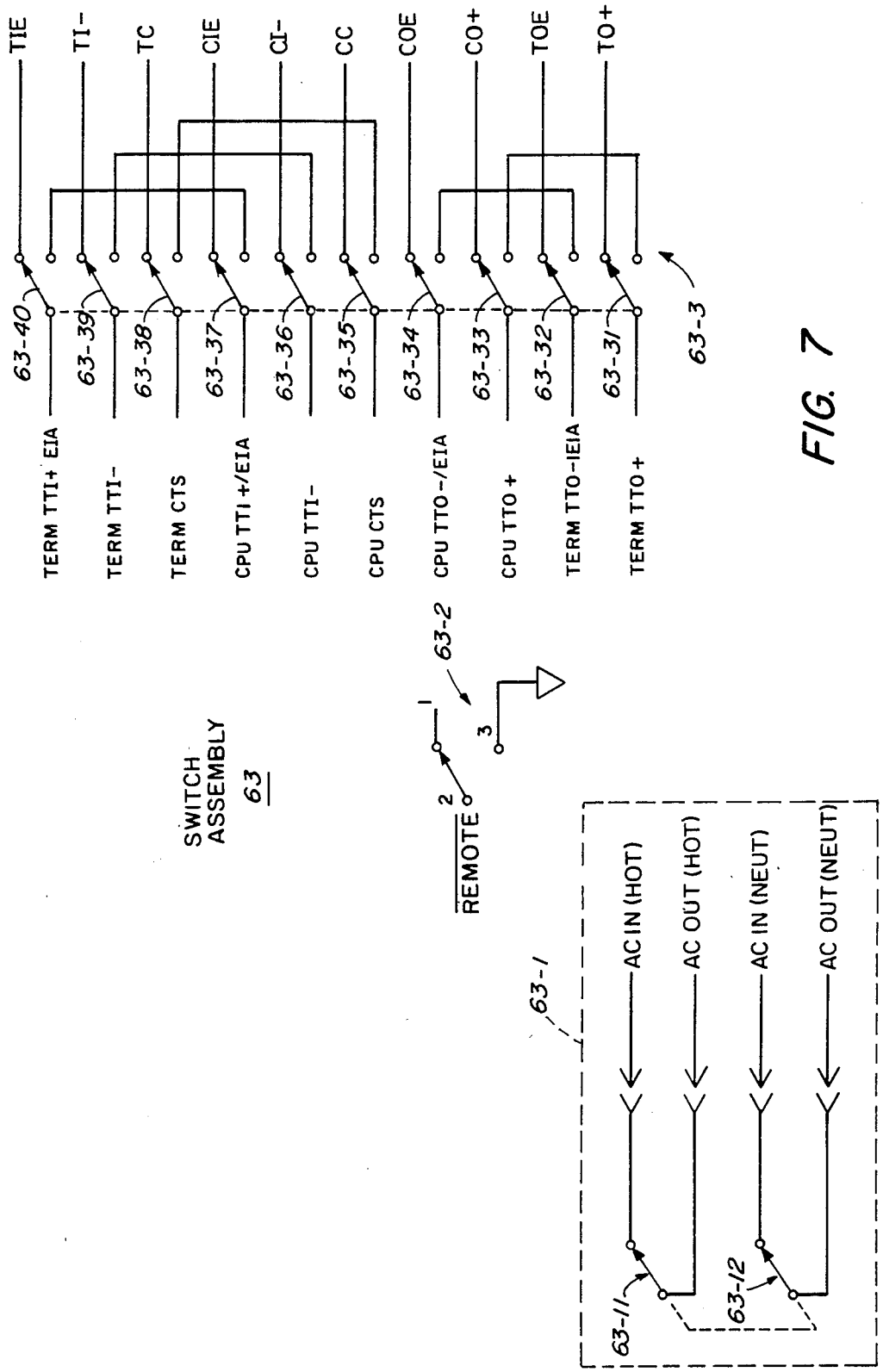
FIG. 7 is a schematic diagram of the switch assembly in the control and switching device shown in FIG. 2.
Figure 8:
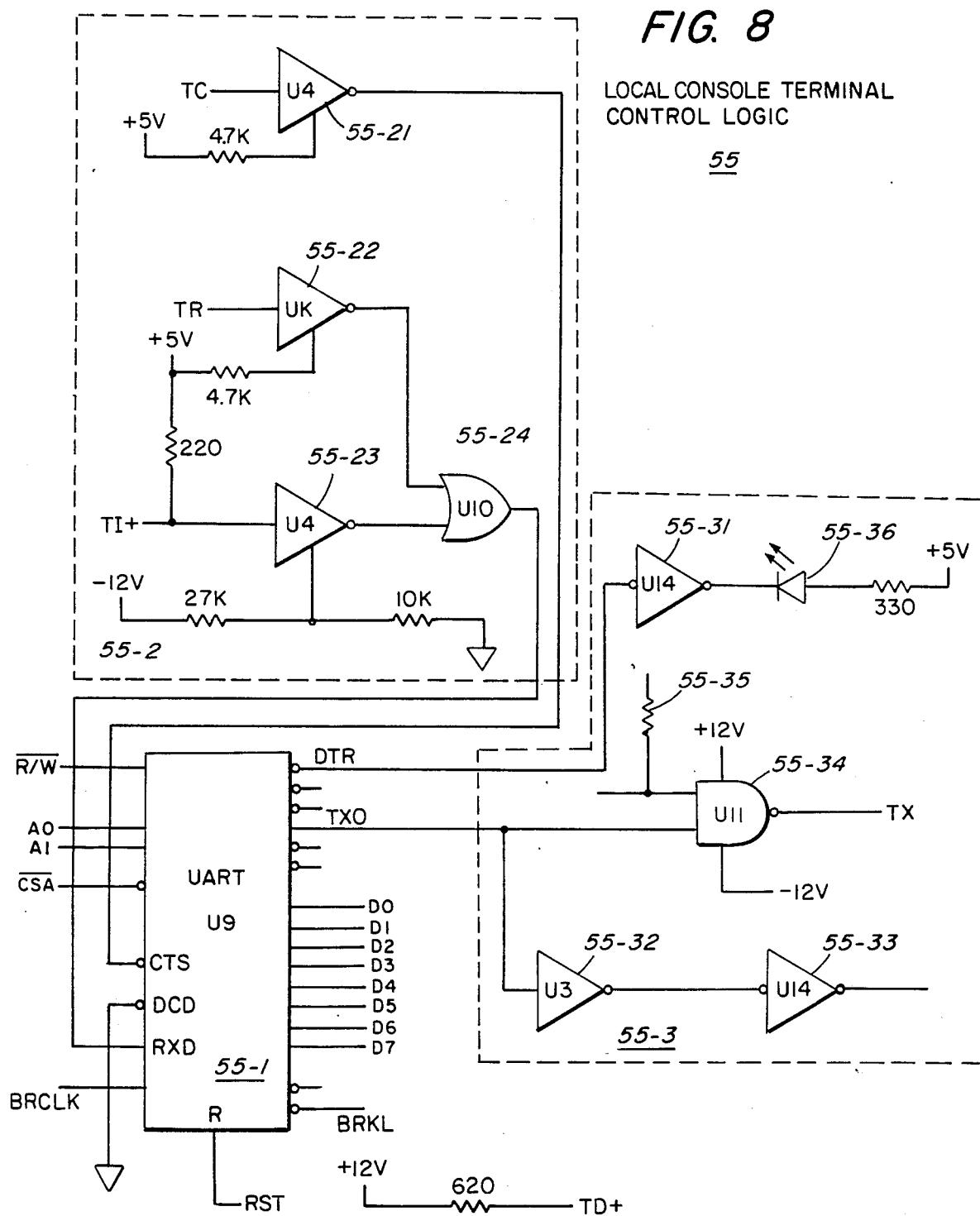
FIG. 8 is a schematic diagram of the local console terminal control logic section shown in FIG. 2.
Figure 9:
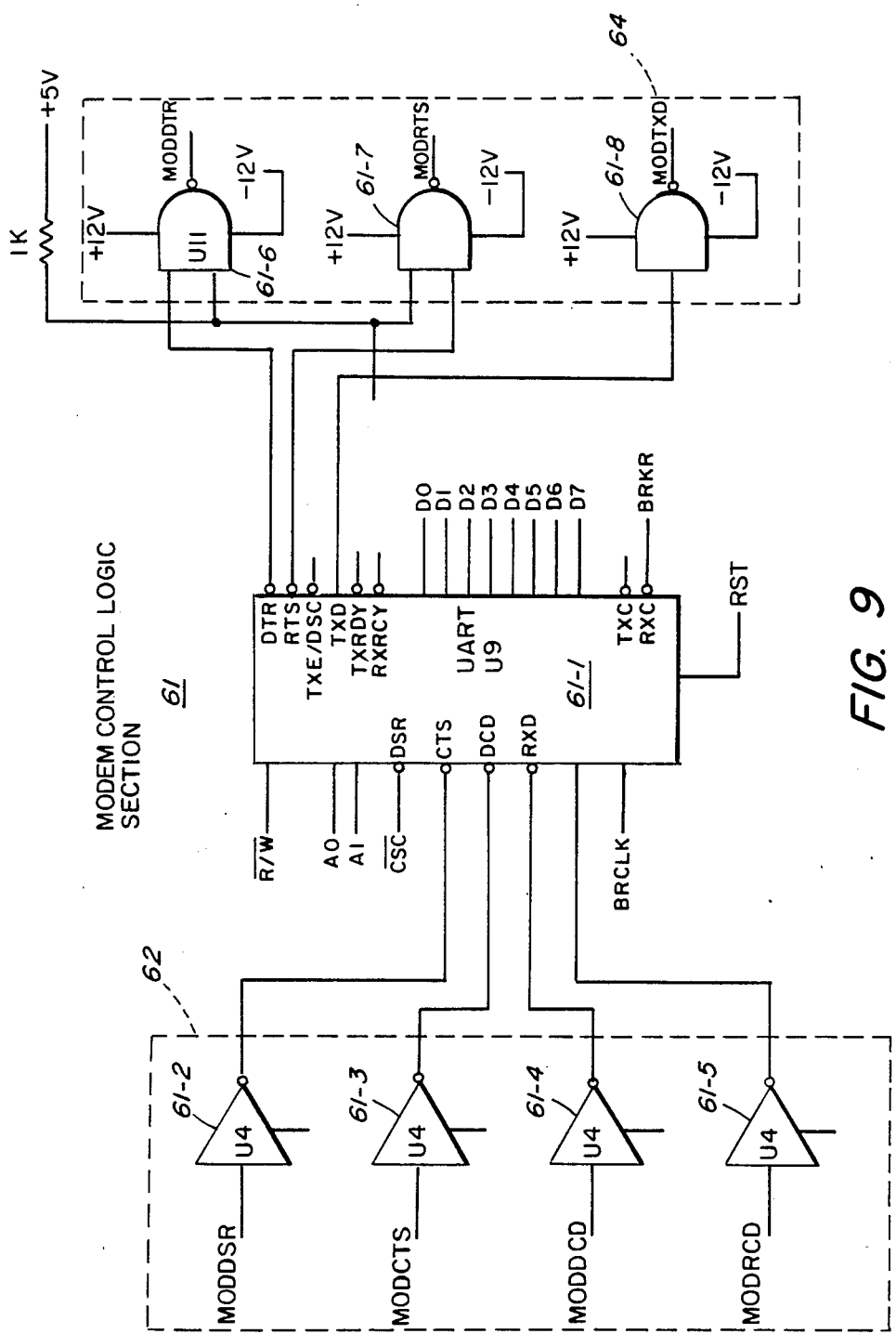
FIG. 9 is a schematic diagram of the modem control logic section shown in FIG. 2.
Figure 10:
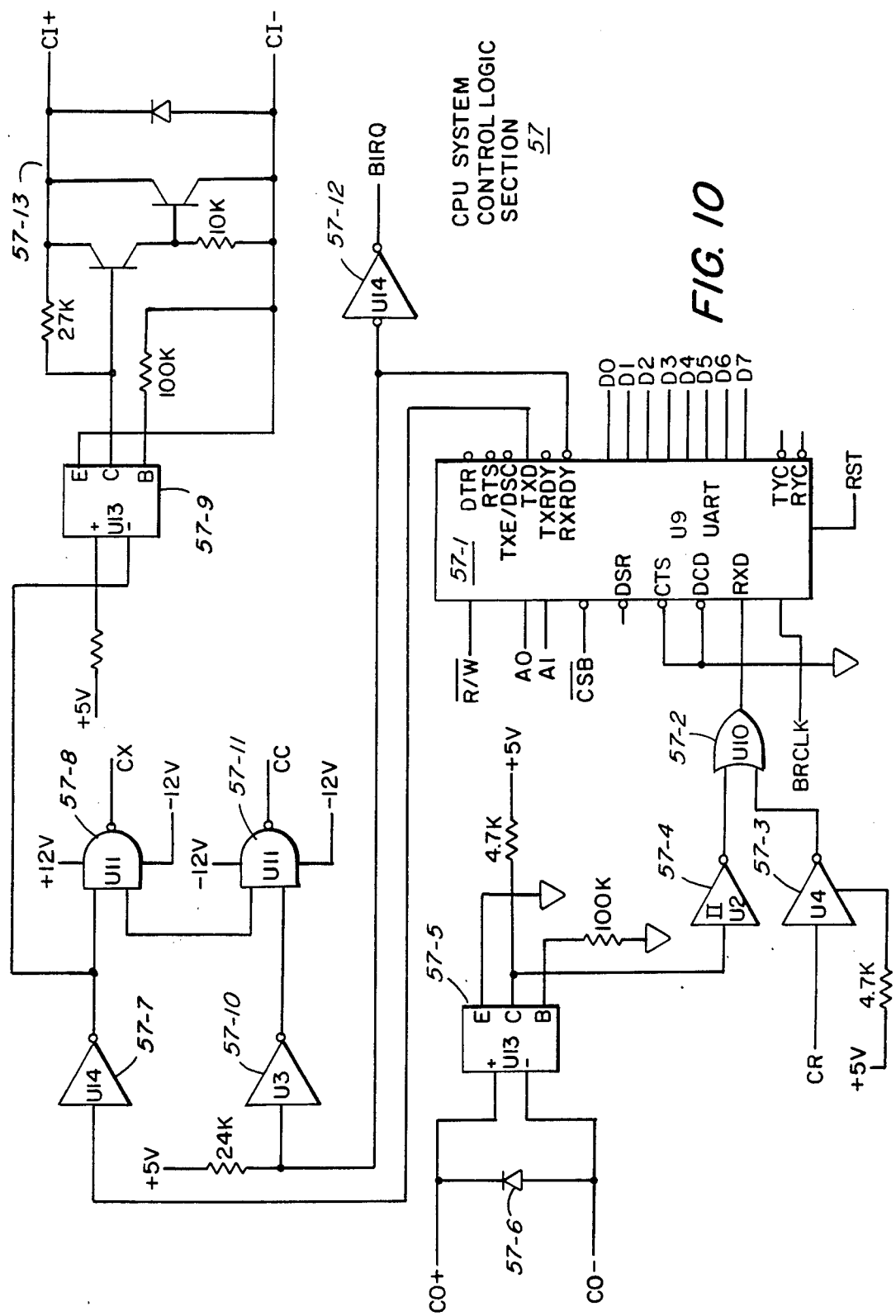
FIG. 10 is a schematic diagram of the CPU system control logic section shown in FIG. 2.
Figure 11:
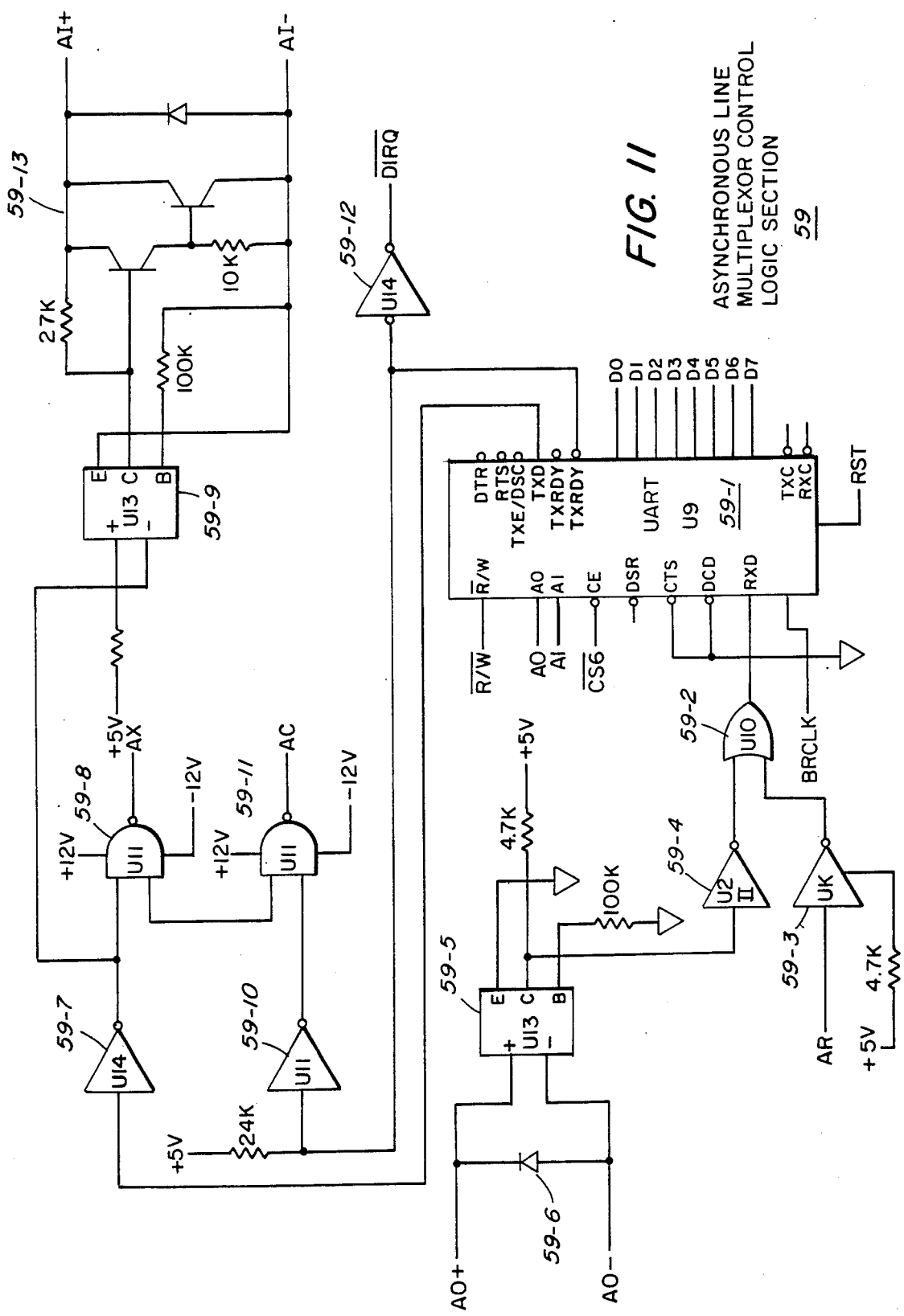
FIG. 11 is a schematic diagram of the asynchronous line multiplexor control logic section in the control and switching device shown in FIG. 2.
Figure 12:
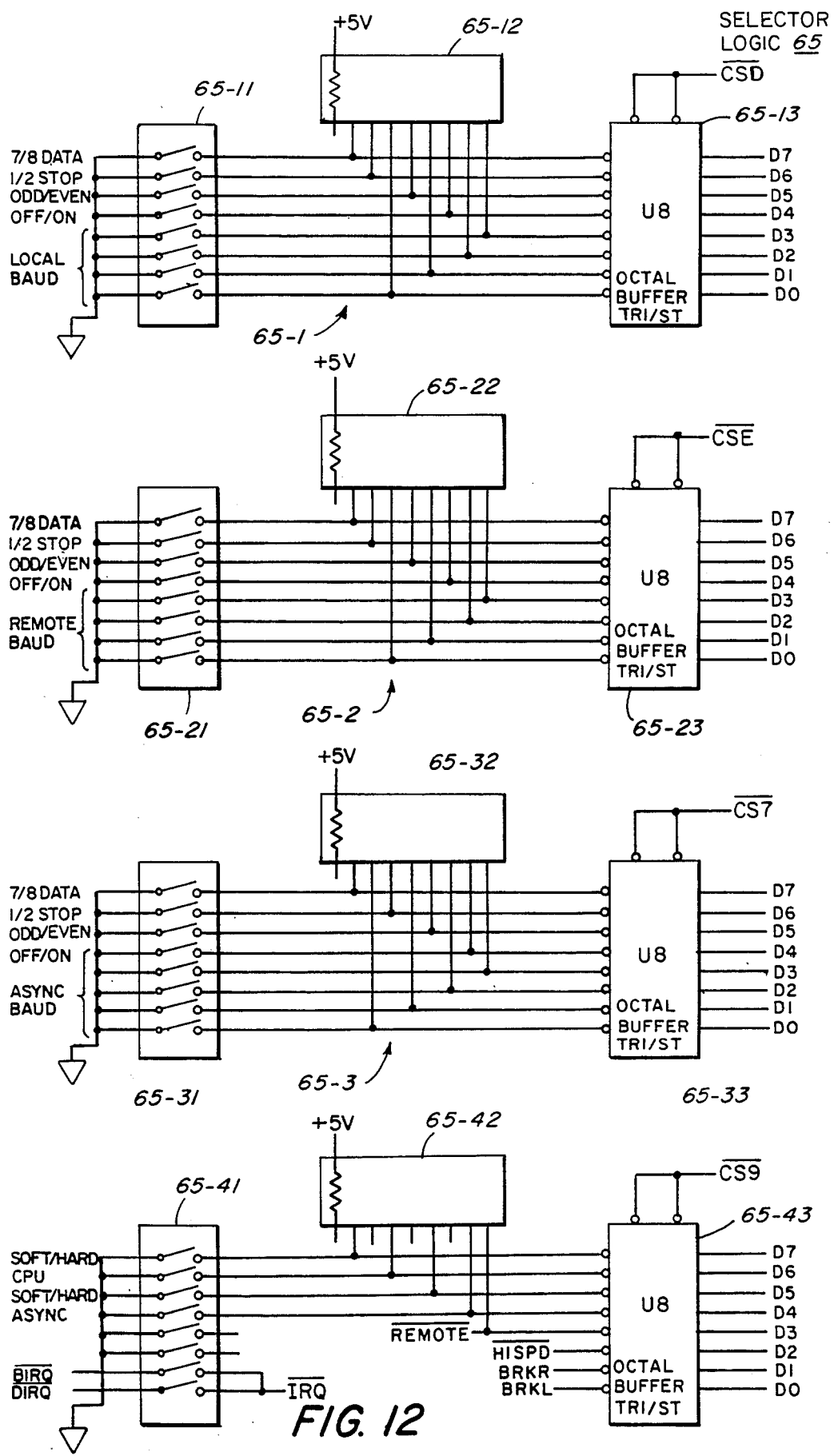
FIG. 12 is a schematic diagram of the selector logic section in the control and switching device shown in FIG. 2.
Figure 13:
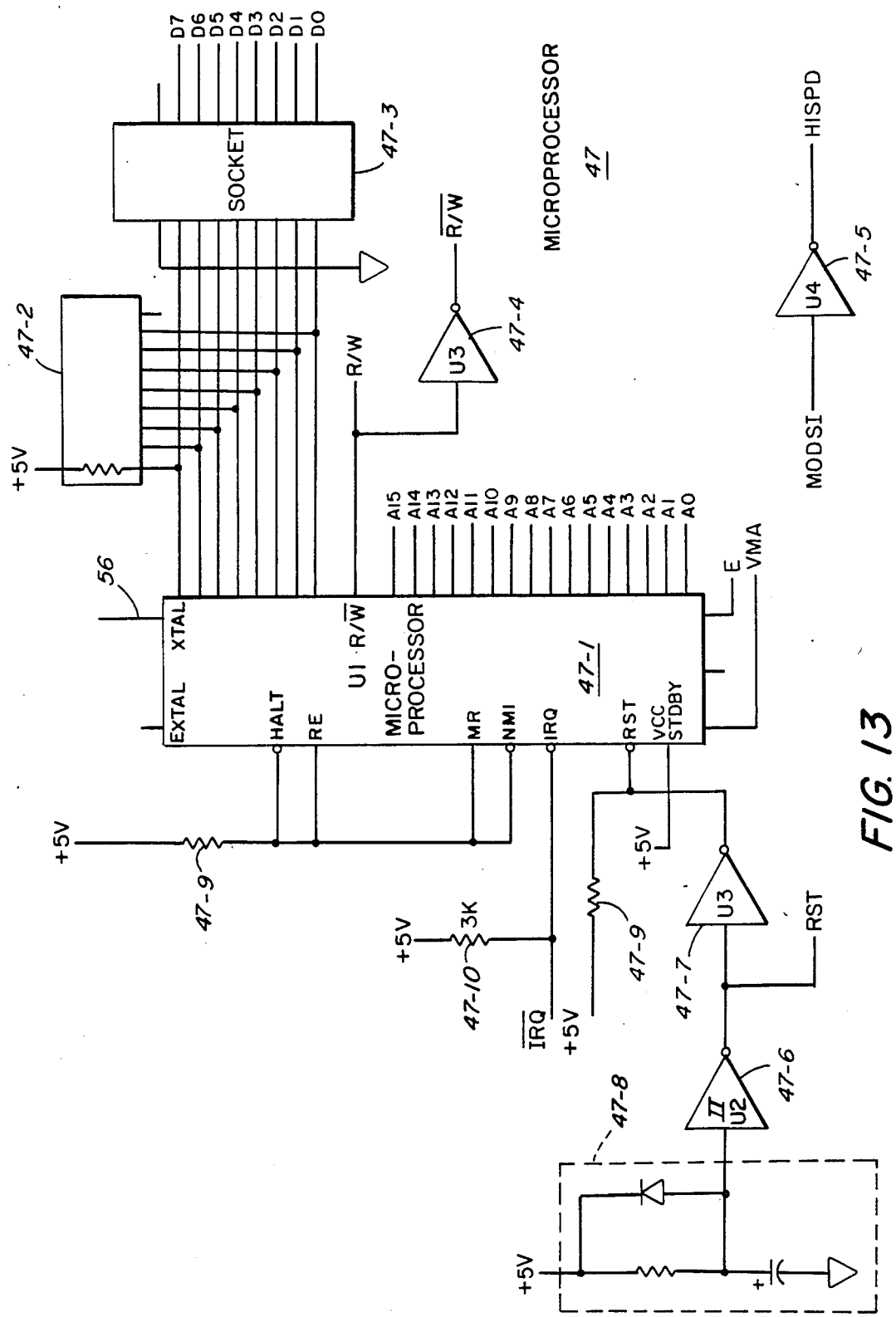
FIG. 13 is a schematic diagram of the microprocessor in the control and switching device shown in FIG. 2.

The details of switch assembly 63 are shown in FIG. 7. Switch 63-1 which serves as the power switch includes two switches 63-11 and 63-12. Switch 63-2 contains a single switch and functions as a remote user switch. Switch 63-3 includes a bank of ten switches 63-31 through 63-40 and serves as a remote switch. Switches 63-1, 63-2 and 63-3 are ganged together (the interconnections not being shown).

Local console terminal control logic section 55 includes a UART 55-1, a receive section 55-2 and a transmit section 55-3. UART 55-1. Receive section 55-2 includes three inverters 55-21, 55-22 and 55-23, a gate 55-24. Transmit section 55-3 includes three inverters 55-31, 55-32 and 55-33, a gate 55-34 a pull-up resistor 55-35 and an LED 55-36.

Modem control logic section 61 includes a UART 61-1, a set of four inverters 62 individually labelled 61-2, 61-3, 61-4, and 61-5 and a set of three NAND gates 64 individually labelled 61-6, 61-7 and 61-8.

CPU system console logic section 57 includes a UART 57-1, a dual input OR gate 57-2, a line receiver 57-3, an inverter 57-4, a first optical isolator 57-5, a diode 57-6, a buffer inverter 57-7, a line driven 57-8, a second optical isolator 57-9 an inverter 57-10, a line driven 57-11, an inverter 57-12 and a 20 ma loop 57-13.

Asynchronous line multiplexor logic section 59 includes a UART 59-1, a dual input OR gate 57-2, a line receiver 59-3, an inverter 59-4, a first optical isolator 59-5, a diode 59-6 a buffer inverter 59-7, a line driver 59-8, a second optical isolator 59-9, an inverter 59-10, a line driver 59-11, an inverter 59-12 and a 20 ma loop 59-13, each of which perform the same function as the corresponding elements in CPU system console logic section 57.

Selector logic section 65 includes four subsections 65-1 65-2, 65-3 and 65-4. Subsection 65-1 is for use in conjunction with local console terminal control section 55 and includes a dual in-line switch 65-11, a single in line package of resistors 65-12, and an octal buffer, tri-statable 65-13.

Sub-sections 65-2, 65-3 and 65-4 are identical to sub-section 65-1 but useable in conjunction with CPU system control logic section 57, ALM control logic section 59 and modem control logic section 61, respectively. Thus, each one of subsections 65-2, 65-3 and 65-4 include a dual in-line switch 65-21, 65-31, and 65-41, respectively, a single in-line package of resistors 65-22, 65-32 and 65-42, respectively, and an octal buffer, tri-statable 65-23, 65-33 and 65-43, respectively.

Microprocessor 47 includes a microprocessor chip 47-1, a single in-line package of resistors 47-2, a socket 47-3, a set of inverters 47-4 through 47-7, a power-up reset circuit 47-8, and two pull up resistors 47-9 and 47-10. Switch assembly 63 may be a Model No. DG-TA sold by Electronic Components Groupe of Minneapolis Minn.

In the operation of control and switching device 17, the level of access is controlled by switch assembly 63.

When switch 63-1, the AC power switch, is depressed local console 15 is hardwired to port 33 of CPU 13 and control and switching device 17 is powered down. Remote terminal 23 has no access to CPU 13 and cannot communicate with local console 15. When switch 63-2, the remote user switch, is depressed control and switching device 17 is powered on, local console 15 is hardwired to port 33 of CPU 13 and remote terminal 23 is electrically connected to port 37 of CPU 13. Two commands which will hereinafter be described are available to remote terminal 23. When switch 63-3, the remote switch is depressed control and switching device 17 is powered on local console 15 and remote terminal 23 both may have access to either port 33 of CPU 13 and/or can communicate with each other after the proper commands have been issued. In addition, Remote Terminal 23 may have access to port 37 of CPU 13 while local console 15 may monitor this access.

Commands are effected by striking BREAK key and then a single character command. The first prompt is seen at the terminal issuing the command and the second prompt by the other terminal. Except as noted below the various commands may be executed only when switch 63-3, the remote switch, is depressed and may be executed by either terminal. The single command characters are as follows: M, R, C, D, X, U, Q, B, H, S.

When the M command is executed, the commanding terminal (i.e. the terminal issuing the command) is on-line to CPU 13 through port 33 and can either send or receive data. The other terminal can receive data from CPU 13 through port 33 but cannot transmit data to CPU 13.

When the R command is executed, the commanding terminal can receive data from CPU 13 through port 33 but cannot transmit data to CPU 13. The other terminal is on line to CPU 13 through port 33 and can either send on receive data.

When the C command is executed, both terminals are off-line to CPU 13 but are linked to each other (through control and switching device 17) for communication with each other (i.e. in a conversation mode).

When the D command is executed, local console 15 is off-line to CPU 13 but may issue commands to control and switching device 17. Remote terminal 23 is on-line to CPU 13 through port 33.

When the X command is executed, local console 15 is on-line to CPU 13 through port 33 and remote console 23 is on-line to CPU 13 through port 37.

The U and Q commands are identical to the M and R commands except that they connect control and switching device 17 to port 37 of CPU 13 rather than port 33. Thus, if local console 15 issues a U command, local console 15 is on-line to CPU 13 through port 37 and remote terminal 23 may receive data from port 37. If local console 15 issues a Q command, local console 15 may only receive data from port 37 of CPU 13 and remote terminal 23 is on-line to CPU 13 through port 37. On the other hand, if the remote terminal 23 issues a U command, remote terminal 15 is on line to CPU 13 through port 37 and local terminal 15 may receive data from port 37. If remote terminal 23 issues a Q command, remote terminal 23 may receive data from 37 of CPU 13 and local terminal 15 is on-line to CPU 13 through port 37.

The B command means to send a line break, and the S command means to enter a "service" mode. When the H command is issued the current operating mode is suspended and a command set list and status information are typed out to the commanding console. The current operating mode then resumes.

If the $\phi$ command is issued, remote terminal 23 is disabled from control and switching device 17 and local console 15 can issue B, H or access command.

If the 1 , command is issued, remote terminal 23 can issue the B and H commands and can only access port 37 of CPU 13. Only the local console 15 may issue a 1 command. Local console 15 may issue B, H an access command.

If the 2 command is issued either terminal can access CPU 13 through either port 33 or port 37. Terminal 15 can issue any commands and terminal 23 can issue any commands except 0, 1 and 2.

The parts making up control and switching device 17 may be in the form of IC chips or sections of IC chips and may be as listed in the following table:

| COMPONENT NUMBER | CHIP TYPE | MANUFACTURER |
| --- | --- | --- |
| U14 | SN7407N | Texas Instrument Corp. |
| U13 | MCT2E | Monsanto |
| U12 | SN74S86 | Texas Instrument Corp. |
| U4 | MC1489AL | Motorola Corporation |
| U11 | MC1488L | Motorola Corporation |
| U3 | SN74LS04 | Texas Instrument Corp. |
| U8 | SN74LS240 | Texas Instrument Corp. |
| U14 | SN74LS138 | Texas Instrument Corp. |
| U10 | SN74LS32N | Texas Instrument Corp. |
| U2 | SN74LS14N | Texas Instrument Corp. |
| U5 | SN74LS390 | Texas Instrument Corp. |
| U6 | 2114L-3 | Intel |
| U1 | MC6802L | Motorola Corporation |
| U9 | SC2661 | Signetics Corporation |
| U7 | 2732 | Hitachi |

The various features and advantages of the invention are thought to be clear from the foregoing description. Various other features and advantages not specifically enumerated will undoubtedly occur to those versed in the art, as likewise will many variations and modifications of the preferred embodiment illustrated, all of which may be achieved without departing from the spirit and scope of the invention as defined by the following claims.

What is claimed is:

1. A computer network for transmitting and receiving data over a telephone line comprising:
   a. a local site, said local site including:
      i. a CPU having a TTY port and an ASYNC port,
      ii. a local console,
      iii. a modem coupled to said telephone line, and
      iv. a control and switching device coupled through separate lines to said TTY port, to said ASYNC port, to said modem and to said local console for controlling the flow of data between said CPU said local console and said modem, and
   b. a remote site, said remote site including:
      i. a remote terminal, and
      ii. a modem coupled to said remote terminal and to said telephone line,
   c. said control and switching device including:
      i. a first port for coupling said control and switching device to said local console,
      ii. a second port for coupling said control and switching device to said TTY port,
      iii. a third port for coupling said control and switching device to said ASYNC port,
      iv. a fourth port for coupling said control and switching device to said modem, and v. a switch assembly having a set of three switches for operating said control and switching device in any one of three modes, one switch arranged to connect said local console to said TTY port and power down said control and switching device for operation in a first mode, another switch arranged to connect said local console to said TTY port and connect said modem at said local site to said ASYNC port for operation in a second mode and said third switch arranged to electronically connect both said local console and said modem at said local site to either said TTY port or said ASYNC port for operation in a third mode.

2. The computer network of claim 1 and wherein said first, second and third switches are interlocked.

3. The computer network of claim 2 and wherein said control and switching device further includes a microprocessor.

4. The computer network of claim 3 and wherein said control and switching device further includes means responsive to a signal from said local console for changing the operating mode of the network.

5. The computer network of claim 4 and wherein said local console has a keyboard having a key labelled BREAK KEY and wherein said signal for changing said operating mode is achieved by depressing said key labelled BREAK KEY and then depressing a key of a selected one of a plurality of predetermined ASCII characters.

6. The computer network of claim 5 and wherein one ASCII character places one terminal on line to the CPU TTY Port and allows the other terminal to receive data only from said CPU TTY port.

7. The computer network of claim 6 and wherein another ASCII character locks out the CPU and places both terminals in a conversion mode.

8. The computer network of claim 7 and wherein another ASCII character locks out the CPU and places the local terminal off-line but capable of issuing commands to the control and switching device and places the remote terminal on-line to the CPU TTY port.

9. The computer network of claim 8 and wherein another ASCII character places both terminals on-line to both ports of said CPU.

10. The computer network of claim 3 and wherein said control and switching device further includes a memory.

11. The computer network of claim 10 and wherein said control and switching device further includes means for interfacing said microprocessor to said local console, means for interfacing said microprocessor to said CPU TTY port, means for interfacing said microprocessor to said CPU ASYNC port and means for interfacing said microprocessor to said modem.

12. A control and switching device for use in interconnecting a CPU, a local console and a modem at a first location so that a remote terminal coupled to a modem at a remote location can access said CPU over a telephone line, said CPU including a TTY port and a ASYNC port, said switching device comprising:

a. a first port for coupling said control and switching device to said local console, b. a second port for coupling said control and switching device to said TTY port in said CPU, c. a third port for coupling said control and switching device to said ASYNC port in said CPU, d. a fourth port for coupling said control and switching device to said modem, and e. a switch assembly having a set of three interconnected switches for operating in three different modes, one switch arranged to connect said local console to said TTY port of said CPU and power down said control and switching device, another switch arranged to connect said local console to said TTY port of said CPU and said modem at said first location to said ASYNC port of said CPU and said third switch arranged to connect said local console and said modem at said first location to both said TTY port and said ASYNC port of said CPU.

13. The control and switching device of claim 12 and wherein said first, second and third switches are interlocked.

14. The control and switching device of claim 13 and further including means responsive to a signal from said local console for changing the operating mode of the control and switching device.

15. The control and switching device of claim 14 and wherein said local console includes a keyboard having a key labelled BREAK KEY and a plurality of keys corresponding to ASCII characteres and wherein said signal is achieved by depressing said key Break Key and then a key of a selected one of said predetermined ASCII characters.

16. The control and switching device of claim 15 and wherein depressing a key corresponding to one particular ASCII character places said local console on line to the CPU TTY port and allows said remote terminal to receive data only from said CPU TTY port.

17. The control and switching device of claim 15 and wherein another ASCII character locks out the CPU and places said local console and said remote terminal in a conversation mode.

18. The control and switching device of claim 15 and wherein another character places the local console off-line but capable of issuing commands to the control and switching device and places the remote terminal on-line to the CPU TTY port.

19. The control and switching device of claim 15 and wherein another character places said local console and said remote terminal on-line to both ports of said CPU.

20. The control and switching device of claim 13 and further including a microprocessor.

21. The control and switching device of claim 20 and further including a memory.

22. The control and switching device of claim 21 and further including means for interfacing said microprocessor to said local console, means for interfacing said microprocessor to said CPU TTY port, means for interfacing said microprocessor to said CPU ASYNC port and means for interfacing said microprocessor to said modem.

* * * * *